(12) United States Patent
Welch (10) Patent No.: US 7,757,431 B2
(45) Date of Patent: Jul. 20, 2010

(54) LAMP WITH PROTECTED COMBUSTION CHAMBER

(76) Inventor: Tommy D. Welch, 2050 Duncannon, NW., Canton, OH (US) 44708

( * ) Notice: Subject to any disclaimer, the term of this patent is extended or adjusted under 35 U.S.C. 154(b) by 1126 days.

(21) Appl. No.: 11/352,102

(22) Filed: Feb. 10, 2006

(65) Prior Publication Data

US 2006/0123694 A1    Jun. 15, 2006

Related U.S. Application Data

(63) Continuation-in-part of application No. 11/013,776, filed on Dec. 16, 2004, now Pat. No. 7,234,268.

(60) Provisional application No. 60/529,816, filed on Dec. 16, 2003.

(51) Int. Cl.
*A01M 1/20* (2006.01)
(52) U.S. Cl. .......................................... 43/112; 43/113
(58) Field of Classification Search .................. 43/112, 43/113, 107, 139
See application file for complete search history.

(56) References Cited

U.S. PATENT DOCUMENTS

| | | | | |
|---|---|---|---|---|
| 1,965,323 A * | 7/1934 | Taslitt | ......................... | 119/255 |
| 2,731,762 A * | 1/1956 | Jones | .......................... | 43/113 |
| 2,888,205 A * | 5/1959 | Trucco | ......................... | 239/20 |
| 4,086,720 A * | 5/1978 | Wiser | ........................... | 43/113 |
| 5,213,595 A * | 5/1993 | Kim | .............................. | 96/27 |
| 6,594,944 B2 * | 7/2003 | Chura | ........................... | 43/98 |
| 6,675,528 B2 * | 1/2004 | Jablin | .......................... | 43/139 |
| 6,779,296 B1 * | 8/2004 | Mosher, II | ................... | 43/107 |
| 6,817,139 B1 * | 11/2004 | Powell et al. | ................. | 43/113 |
| 6,854,208 B1 * | 2/2005 | Chuang et al. | ................ | 43/125 |
| 6,920,716 B2 * | 7/2005 | Kollars et al. | ................. | 43/114 |
| 7,255,288 B2 * | 8/2007 | Chan | .......................... | 239/16 |

* cited by examiner

*Primary Examiner*—Kimberly S Smith
(74) *Attorney, Agent, or Firm*—Zollinger & Burleson Ltd (57) ABSTRACT

A lamp includes a combustion chamber having a neck that defines a combustion chamber air outlet. A candle is disposed in the combustion chamber and, when burned, creates an upward flow of air and combustion products through the neck. A reservoir is disposed around a portion of the neck with a material to be heated disposed in the reservoir. In one configuration, the material is a candle fuel that is wicked by the neck and drips into the candle to refuel the candle. In another configuration, the material is a scented material that evaporates when heated to distribute the scent. A cooling chamber may be disposed above the combustion chamber with the outlet of the cooling chamber being disposed below the outlet of the neck. Another configuration allows the height of the flame to be adjusted by varying the volume of air allowed to be drawn into the unit.

20 Claims, 9 Drawing Sheets

LAMP WITH PROTECTED COMBUSTION CHAMBER

CROSS REFERENCE TO RELATED APPLICATIONS

This application is a continuation-in-part application claiming priority from U.S. application Ser. No. 11/013,776 filed on Dec. 16, 2004 now U.S. Pat. No. 7,234,268 which claims priority from U.S. Provisional Patent Application Ser. No. 60/529,816 filed Dec. 16, 2003; the disclosures of both are incorporated herein by reference.

BACKGROUND OF THE INVENTION

1. Technical Field

The present invention generally relates to lamps and, more particularly, to oil or wax powered lamps with structures that prevent the lamps from being extinguished in the wind while also providing protection against fires. Specifically, the present invention relates to lamps having such combustion chambers that are also adapted to efficiently distribute a scent into the air while the lamp burned.

2. Background Information

Various wax and oil lamp structures are known in the art. Candles and lamps that allow the flame to be exposed can be dangerous. The art recognizes that surrounding the flame of a candle or lamp protects the flame from being blown out while also reducing the ability of the flame to catch nearby articles on fire. Despite the various structures known in the art, room remains for improvements.

BRIEF SUMMARY OF THE INVENTION

The invention provides lamp configurations wherein a candle (oil or wax fueled) is burned inside a combustion chamber having a neck at defines the outlet to the chamber. The lamp prevents the candle from being blown out while also providing a safe housing for burning the candle.

The lamp provides configurations for efficiently distributing a scent when the lamp is burned. The lamp provides a variety of different locations where a scent such as a scented liquid may be held where it can be evaporated into the exhaust flow and distributed into the atmosphere surrounding the lamp.

In one configuration, the lamp includes a combustion chamber having a bottom wall and a sidewall that tapers to a neck; the sidewall defining an air inlet and the neck defining a combustion chamber air outlet. A candle is disposed in the combustion chamber. A reservoir is disposed around a portion of the neck with a scented material disposed in the reservoir. A cooling chamber is disposed above the combustion chamber with the combustion chamber air outlet being the inlet to the cooling chamber. The cooling chamber having an air outlet with the air outlet to the cooling chamber being disposed below the inlet to the cooling chamber such the air flow through the cooling chamber is turned downward from the neck of the combustion chamber.

In another configuration, the invention provides a lamp having a combustion chamber having a neck that defines a combustion chamber air outlet. The neck has a drip edge at the lower end of the neck. A candle is disposed in the combustion chamber below and in line with the drip edge. A reservoir is disposed around a portion of the neck with candle fuel disposed in the reservoir such that the neck becomes heated when the candle is burned to wick the candle fuel onto the neck where it drips down to refuel the candle.

In another configuration, the invention provides an air inlet base that functions as an air cleaner for the air being drawn into the lamp. The air cleaner uses a porous filter in combination with a static water filter to remove particulate from the incoming air flow. The air inlet base is adjustable to allow the user to control the height of the flame by adjusting the volume of air that is allowed to enter the combustion chamber.

A further configuration of the invention provides a candle wick holder that efficiently burns the wax of a candle by spreading the heat of the flame over a wider area to evenly melt a wide area of wax. The wick holder has a bowl-shaped base plate that defines an opening that allows the liquid wax to flow into the bowl where it contacts the wick. This wick holder may be used alone or in combination with the devices described above.

The different configurations of the invention may be used alone or in combination.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
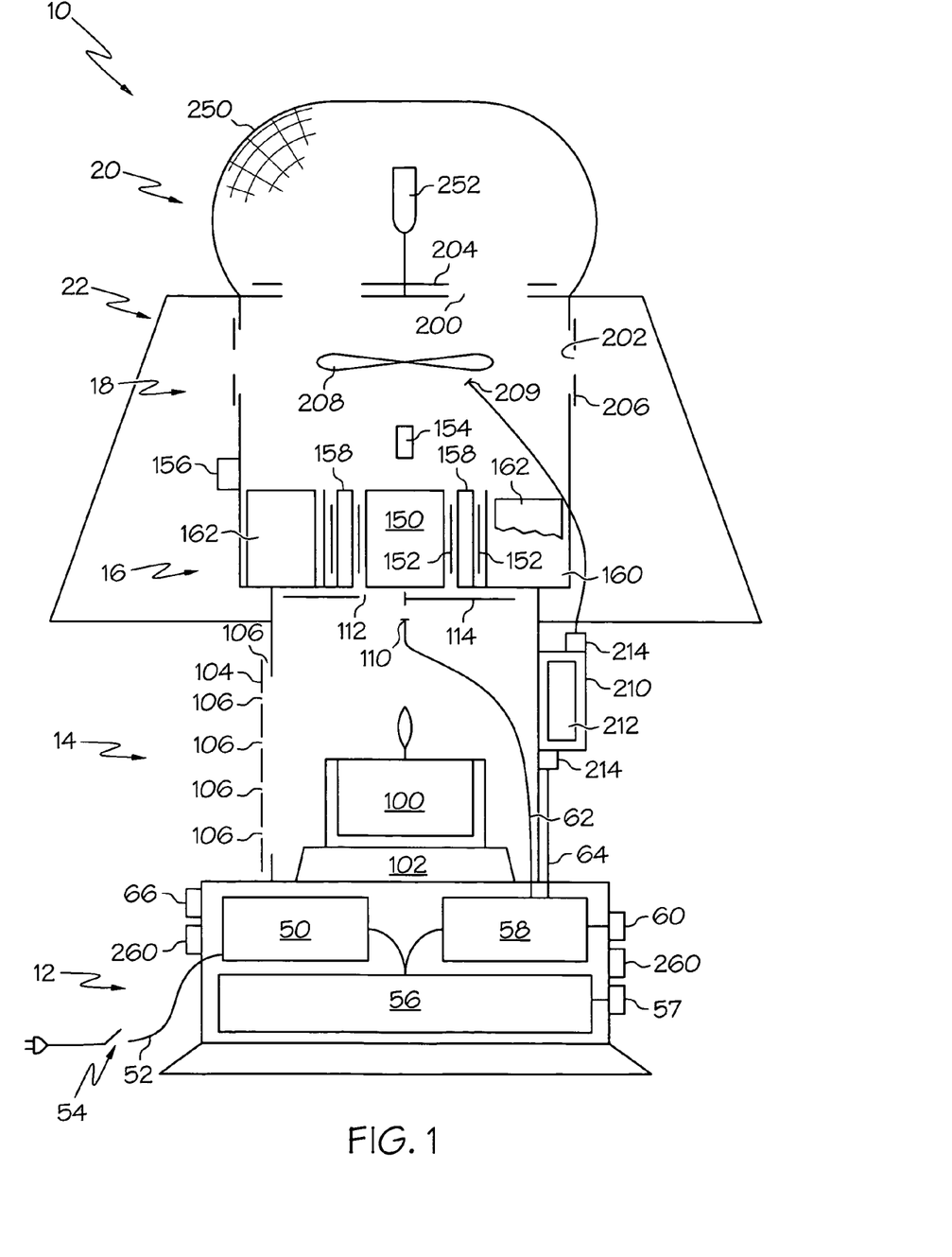
FIG. 1 is a longitudinal sectional view of one embodiment of the device with the components of the device shown schematically.

A first embodiment of the insect killing device of the present invention is indicated generally by the numeral 10 in the accompanying drawings. In one embodiment, device 10 generally includes a control box 12, a combustion chamber 14, a catalyst chamber 16, a mixing chamber 18, a grid assembly 20, and an umbrella 22. Device 10 functions to lure bugs to device 10 and to kill bugs once they arrive. When used outside, device 10 uses carbon dioxide as the primary bait for the bugs. In addition, device 10 may use a scented bait to help lure the bugs. Device 10 may also use light sources to lure the bugs. Device 10 also uses heat to lure the bugs. When used inside to attract flies, device 10 relies on the scented bait, heat, and lights to attract the insects. Device 10 kills the bugs using at least one of an electrified grid and a sticky umbrella 22 that may be used alone or in combination.

Control box 12 generally includes a power supply 50, a power line 52, and a switch 54. Switch 54 allows the user to turn device 10 on and off to conserve power during daylight hours. Switch 54 may be a master switch that controls the power delivered to all other switches described in this application. Alternatively, switch 54 may only control power source 50 with a battery 56 being used to power device 10 when switch 54 is off. Power line 52 and power supply 50 are adapted to run on household current so that device 10 may be plugged into an outlet in a garage or house. Battery 56 may also be provided so that device 10 may run solely on battery power during the evening. Battery 56 may be recharged during the day or after a few evenings. A separate switch 57 may be used to conserve battery power.

An air pump 58 is also disposed in control box 12. A switch 60 is connected to air pump 58 to allow the user to selectively turn air pump 58 on and off. A first air outlet 62 extends from control box 12 into combustion chamber 14 to direct a flow of air from air pump 58 into combustion chamber 14 in the manner described below. A second air outlet 64 may also extend from air pump 58 to mixing chamber 18 as described below in more detail. Air pump 58 is adapted to direct a flow of air through outlets 62 and 64 when air pump 58 is turned on. The inventor has found that a pump for a fish tank is useful for directing these air flows. Control box 12 includes an inlet to allow air to enter control box 12 and access air pump 58. In alternative embodiments, air pump 58 is not used and the flow of air through device 10 is induced by heat.

Control box 12 may also include a switch 66 for the grid assembly 20 if grid assembly 20 is not controlled by switch 54.

Control box 12 is generally adapted to provide a stable stand for device 10 and may include a diameter that is broader than the remaining elements (other than umbrella 22) so that the user may place device 10 on a support surface while it is being used. Control box 12 may thus include a weight (the weight may be the battery 56) to stabilize device 10 when it is standing on a support surface. In other embodiments of the invention, device 10 may be hung from a tree or a stand.

Combustion chamber 14 includes a source of carbon dioxide 100 that may be any of a variety of carbon dioxide sources known in the art. Source 100 may thus be a typical wax candle, an oil lamp, a variety of other candle-like devices, a carbon dioxide cartridge, or a combustion device that burns a substance such as natural gas. These devices may be used alone or in combination. In the preferred embodiment of the invention, a simple wax candle 100 may be used to produce carbon dioxide in combustion chamber 14. Combustion chamber 14 includes a mount 102 that includes a magnet that securely holds candle 100 to mount 102. The magnetic mount is designed to work with a candle 100 having a metal sleeve. Magnetic mount 102 thus helps prevent candle 100 from tipping over when device 10 is being transported and when device 10 is hung from a support and swings in the wind.

Combustion chamber 14 further includes a door 104 that allows candle 100 to be placed into combustion chamber 14 and removed from combustion chamber 14. Door 104 may include a plurality of vents 106 to allow air to enter combustion chamber 14. Door 104 may be held to combustion chamber 14 with magnets. In other embodiments, door 104 is connected to combustion chamber 14 with a hinge.

The outlet end 110 of first air outlet 62 is positioned in combustion chamber 14 above carbon dioxide source 100. Outlet 110 is directed upwardly towards the outlet 112 of combustion chamber 14. A damper 114 may be used to control the air flow out of chamber 14. Outlet 112 is positioned at the top of chamber 14 and leads into catalyst chamber 16. The flow of air coming out of outlet 110 is thus directed immediately into catalyst chamber 16 and induces a flow of air from vents 106 through combustion chamber 14 leading out of outlet 112. The position of outlet 110 and vents 106 prevent candle 100 from blowing out in a strong breeze.

Catalyst chamber 16 includes a catalyst support structure 150 that includes a matrix that holds a catalyst useful for converting carbon monoxide to carbon dioxide. Structure 150 and the matrix allow gas to pass from chamber 14 to chamber 16. In one embodiment, the matrix that holds the catalyst is honeycomb-shaped in cross section and defining a plurality of passageways that pass through the matrix. Structure 150 may include a plurality of small tubes lined with the catalyst. The tubes may be arranged in a honeycomb pattern. The catalyst thus converts a portion of any carbon monoxide created by candle 100 into carbon dioxide. Support structure 150 allows air flow in at least a direction from chamber 14 toward chamber 18. Any catalyst known in the art may be used in this position. For example, the inventor contemplates that a catalyst having silica, platinum, and palladium beads may be used. In one embodiment, an automobile catalytic converter element may be used. These may be obtained from a junk yard and may be cleaned.

Catalyst support structure 150 is surrounded by a heater 152 that is controlled by a thermostat 154 positioned above heater 152 and catalyst support structure 150 at the upper end of catalyst chamber 16 or at the lower end of mixing chamber 18. Thermostat 154 and heater 152 are connected to power source 50. Thermostat 154 is set to control the temperature of catalyst support structure 150 so that the gas passing through structure 150 is heated. This temperature allows the temperature of the carbon dioxide exiting device 10 to match the temperature of carbon dioxide that exits a human being (or a higher temperature) so that mosquitos and other biting insects are drawn to the warm gas. Thermostat 154 thus turns the heater 152 off when the temperature is too high and turns heater 152 on when the temperature is too low. A switch 156 may be provided for thermostat 154 and heater 152.

The catalyst performs best at a high temperature. When the catalyst reaches a temperature of 127-128° F., carbon monoxide is effectively converted to carbon dioxide. The heat is generated from heater 152 and the heat from candle 100. The insulating properties of tube 158 and holding device 162 help warm the catalyst in catalyst support structure 150. The inventor has found that the following temperatures result in the following outputs of carbon monoxide when burning a lamp-oil-fueled candle 100. 127.6° F. results in 0.023 ppm carbon monoxide (measured on a Bacarach monoxide tester), 134.8° F. equals 0.022 ppm carbon monoxide; 141.3° F. results in 0.021 ppm carbon monoxide; 148.1° F. results in 0.020 ppm carbon monoxide; 151.9° F. results in 0.019 ppm carbon monoxide; 155.3° F. results in 0.018 ppm carbon monoxide; 170.2° F. results in 0.009 ppm carbon monoxide; 181.3° F. results in 0.008 ppm carbon monoxide; 190.1° F. results in 0.007 ppm carbon monoxide; 198.7° F. results in 0.006 ppm carbon monoxide; 206.4° F. results in 0.005 ppm carbon monoxide; 211° F. results in 0.004 ppm carbon monoxide; 216° F. results in 0.003 ppm carbon monoxide; 223.0° F. results in 0.002 ppm carbon monoxide; and 234.7° F. results in 0.001 ppm carbon monoxide. The inventor thus believes that a preferred embodiment of the invention should keep the temperature of catalyst chamber 16 at 206° F. This temperature also keeps the gas hot enough to exit device 10 at around 100° F.

Heater 152 may be disposed immediately adjacent catalyst support structure 150 or on the outside of an isolation tube 158. Isolation tube 158 surrounds catalyst support structure 150 and isolates it from a bait chamber 160. Isolation tube 158 may be fabricated from any of a variety of materials. When heater 152 is positioned inside isolation tube 158, isolation tube 158 may be fabricated from an insulating material such as glass. When heater 152 is disposed on the outside of isolation tube 158, isolation tube 158 may be fabricated from a material that transmits heat such as metal. In another embodiment, heater 152 is a coil heater with coils on the inside and outside of isolation tube 158.

A holding device 162 is disposed in bait storage chamber 160. Holding device 162 may be a porous material that holds a liquid bait designed to attract biting insects. The liquid bait is evaporated with the heat from heater 152 and rises upwardly into the air stream exiting catalyst chamber 16. A variety of baits may be used in bait chamber 160. One embodiment of a bait that has been found to be useful is a combination of water, gelatin, sugar, and flavoring. Oil may be added to reduce spoilage. Beef drippings may be used with water or oil to attract flies. Citric acid may be added to improve the smell. This bait may be disposed in bait chamber 160 in liquid form with or without holding device 162. One holding device 162 that is useful with this bait is a porous silica material. The silica material will not burn when exposed to the heat from heater 152. An alternative embodiment uses an additional bait cup to hold liquid bait.

Figure 2:
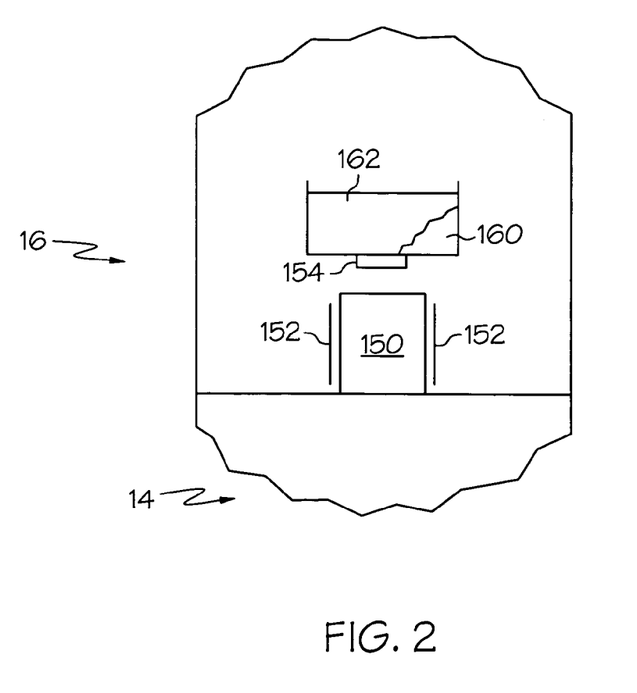
FIG. 2 is a schematic view of an alternative catalyst chamber.

An alternative location for the bait is depicted in FIG. 2 wherein a bait holding chamber 160 is disposed immediately above catalyst support structure 150. This location has the benefit of being directly above the heated air flow. This location may thus increase the evaporation of the bait in chamber 160. In an alternative embodiment, an insecticide may be placed in the bait locations with device 10 being used to distribute the insecticide.

Mixing chamber 18 is disposed above catalyst chamber 16. Mixing chamber 18 allows the carbon dioxide to mix with the evaporated bait. Mixing chamber 18 also distributes the baited air flow to the traps where the bugs are killed. Mixing chamber 18 may include a vertical release 200 and a horizontal release 202 that are each controlled by dampers 204 and 206. Dampers 204 and 206 allow the user to control the release of the baited air flow to the different traps depending on the location of device 10. A fan 208 may be used to induce the flow of bait through device 10 and to distribute the flow through releases 200 and 202. As depicted in FIG. 1, fan 208 is disposed radially inwardly of grid 250. Second air outlet 64 has an outlet 209 disposed in mixing chamber 18. If desired, a second bait chamber 210 may be used with device 10. A secondary bait 212 such as octenol may be positioned in second bait chamber 210. Second bait chamber 210 may be selectively opened and closed with valves 214. Valves 214 thus allow the user of device 10 to conserve second bait 212 that may be expensive to replace. Valves 214 may be closed during the day to prevent release of second bait 212.

Fan 208 may be configured to draw air (and thus any live insects) from inside grid assembly 20 as well as chamber 18. The air is then pushed out release 202 while killing any insects drawn from assembly 20.

Grid assembly 20 is positioned above vertical release 200 and includes an electrified grid 250 and a light 252 that are each controlled by power source 50 and a switch. Light 252 may be a blue light that is useful for attracting biting insects. Grid 250 carries an electric charge that is suitable to kill insects that come in contact with grid 250 or pass through the openings of grid 250. Device 10 introduces the baited air flow through release 200 into the center of grid 250 and thus attracts biting insects with light 252 and the baited air flow.

Device 10 also includes umbrella 22 that extends circumferentially around mixing chamber 18 and downwardly in the shape of a cone or an umbrella. Umbrella 22 is coated with a sticky substance that traps insects against umbrella 22 when an insect comes into contact with the sticky substance. The substance may be disposed only on the underside of umbrella 22 to reduce other objects from sticking to umbrella 22. In other embodiments, both the upper and lower surfaces of umbrella 22 may be coated. Umbrella 22 has been found to be particularly useful when device 10 is positioned a few feet above the ground because many mosquitos hover near the ground. When the mosquitos are drawn upwardly towards grid assembly 20, they come into contact with umbrella 22 and become stuck in the sticky substance. To further lure mosquitos and biting insects in this direction, release 202 directs the baited air flow outwardly under umbrella 22 where it falls downwardly towards the ground. Umbrella 22 may be solid or a mesh and may be readily disposable and replaceable once laden with dead insects. Dried gelatin or other bait may be disposed on umbrella 27.

In addition to light 252, device 10 may use a transparent body around combustion chamber 14 to allow the light of candle 100 to be viewed from outside device 10. The light from candle 100 is also useful for luring biting insects towards device 10. The transparent body may be combined with light reflecting and distributing devices (such as glass beads) that distribute the light and change its color. In addition, a "power on" light 260 may be disposed on the outside of control box 12 to inform the user of device 10 that device 10 is properly powered. Light 260 may be designed to lure biting insects towards device 10. In the preferred embodiment, lights 252, 260, and a light from candle 100 are different types of lights in order to lure different types of biting insects towards device 10.

Figure 3:
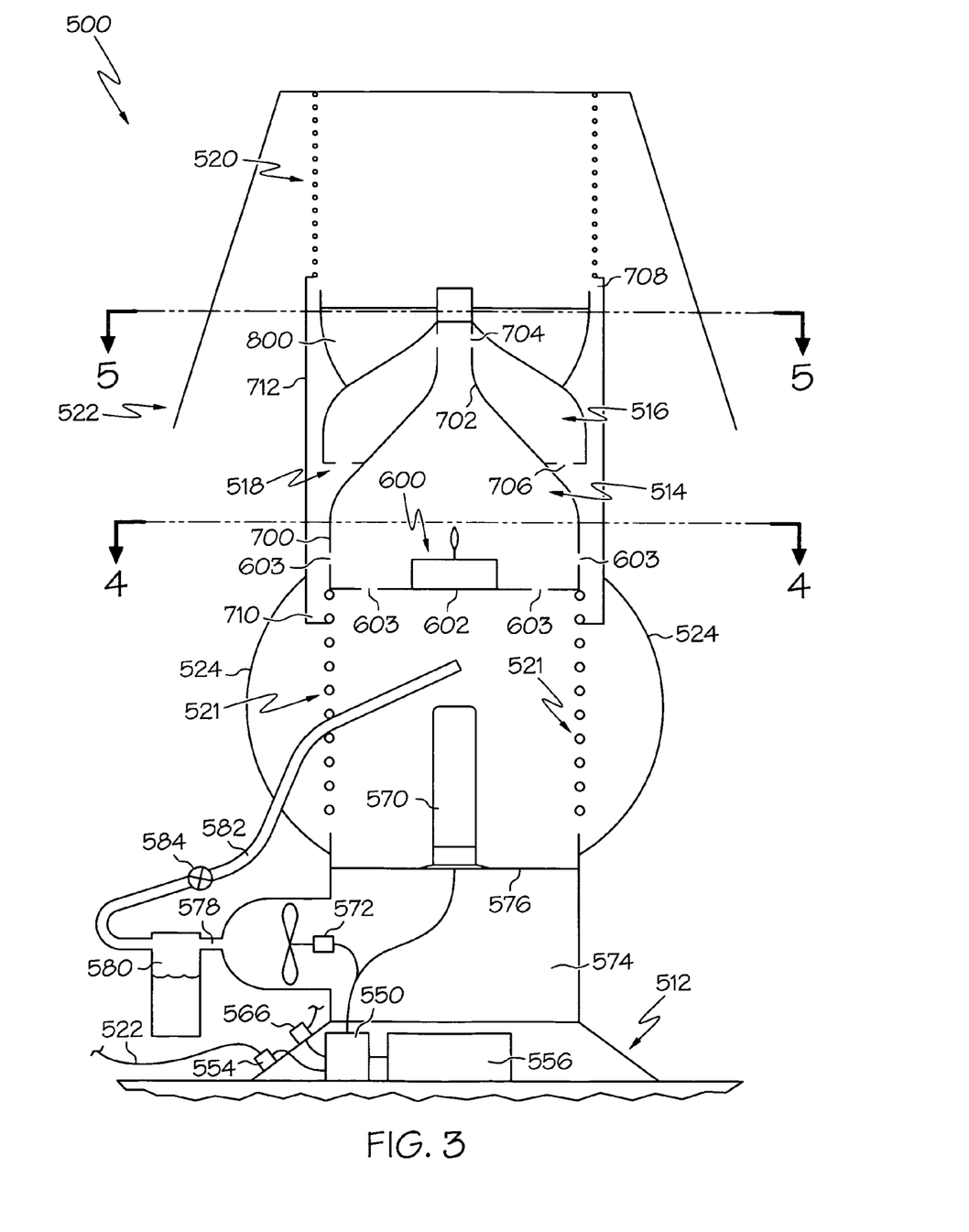
FIG. 3 is a longitudinal section view of another embodiment of the device with the components of the device shown schematically.
Figure 4:
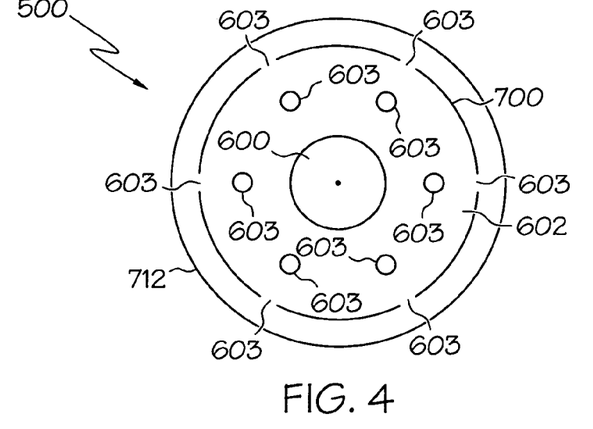
FIG. 4 is a section view taken along line 4-4 of FIG. 3.
Figure 5:
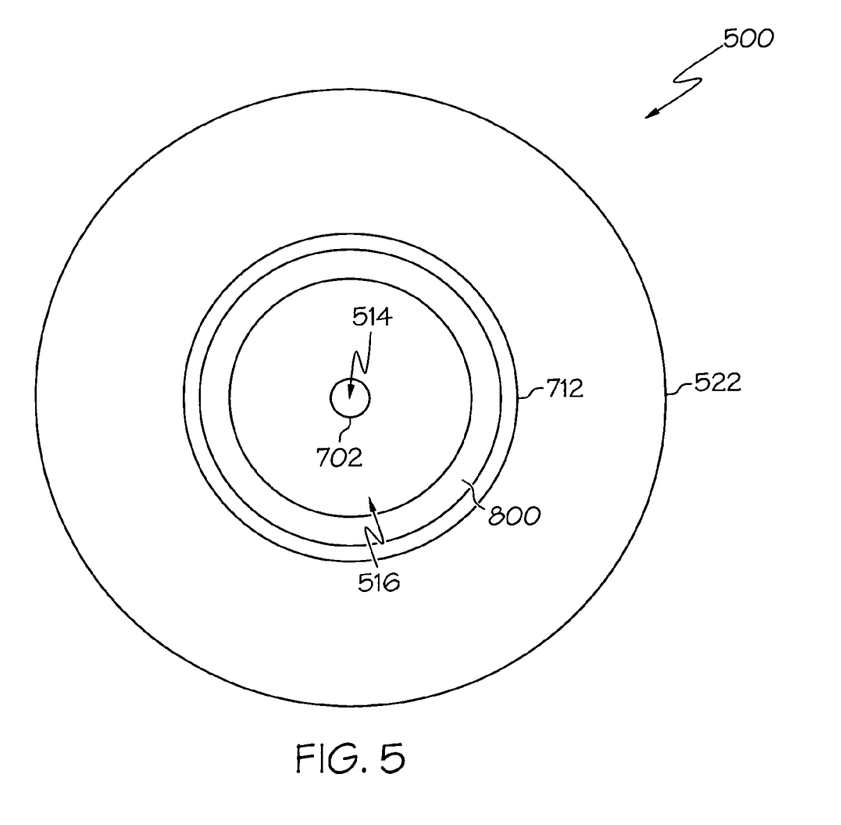
FIG. 5 is a section view taken along line 5-5 of FIG. 3.

A second embodiment of the insect killing device of the present invention is indicated generally by the numeral 500 in the accompanying drawings. In one embodiment, device 500 generally includes a control box 512, a combustion chamber 514, a cooling chamber 516, a mixing chamber 518, first and second grid assemblies 520, 521 and an umbrella 522. Umbrella 522 protects first grid 520 while a cage 524 protects second grid 521. Cage 524 may also be sticky to catch bugs. Umbrella 522 may also protect device 500 from rain. Device 500 functions to lure bugs to device 500 and to kill bugs once they arrive. When used outside, device 500 uses carbon dioxide as the primary bait for the bugs. In addition, device 500 may use a scented bait to help lure the bugs. Device 500 may also use light sources to lure the bugs. Device 500 also uses heat to lure the bugs. When used inside to attract flies, device 500 relies on the scented bait, heat, and lights to attract the insects. Device 500 kills the bugs using at least one of an electrified grid and a sticky umbrella 522 that may be used alone or in combination.

Control box 512 generally includes a power supply 550, a power line 552, and a switch 554. Switch 554 allows the user to turn device 500 on and off to conserve power during daylight hours. Switch 554 may be a master switch that controls the power delivered to all other switches described in this application. Alternatively, switch 554 may only control power source 550 with a battery 556 being used to power device 500 when switch 554 is off. Power line 552 and power supply 550 are adapted to run on household current so that device 500 may be plugged into an outlet in a garage or house. Battery 556 may also be provided so that device 500 may run solely on battery power during the evening. Battery 556 may be recharged during the day or after a few evenings. Control box 512 may also include a switch 566 for the grid assemblies 520, 521 if grid assemblies 520, 521 are not controlled by switch 554. Control box 512 is generally adapted to provide a stable stand for device 500 and may include a diameter that is broader than the remaining elements (other than umbrella 522) so that the user may place device 500 on a support surface while it is being used. Control box 512 may thus include a weight (the weight may be the battery 556) to stabilize device 500 when it is standing on a support surface. In other embodiments of the invention, device 500 may be hung from a tree or a stand.

Power source 550 supplies power to a light 570 disposed inwardly of grid 521. Light 570 is a type designed to attract insects to grid 521. Power source 550 also supplies power to a mechanism 572 that moves air through a lower chamber 574. Mechanism 572 may be a fan, an air pump, or another device that moves air and carbon dioxide from an inlet 576 to an outlet 578 of chamber 574. Mechanism 572 vibrates while in use to attract insects to device 500. A bait container 580 is in fluid communication with outlet 578. Any of a variety of baits may be used in container 580. A delivery tube 582 provides fluid communication between container 580 and a delivery location disposed adjacent to or inwardly of one of or both grids 520,521. A valve 584 may be used to seal container 580 to preserve the bait in container 580.

Combustion chamber 514 includes a source of heated carbon dioxide 600 that may be any of a variety of carbon dioxide sources known in the art. Source 600 may thus be a typical wax candle, an oil lamp, a variety of other candle-like devices, a carbon dioxide cartridge, or a combustion device that burns a substance such as natural gas. These devices may be used alone or in combination. When sources of carbon dioxide are used that do not involve combustion to produce heat, a heater (such as an electric heater) is used to heat the carbon dioxide in chamber 514. In the preferred embodiment of the invention, a simple wax candle 600 may be used to produce carbon dioxide in combustion chamber 514. Combustion chamber 514 includes a mount 602 that includes a magnet that securely holds candle 600 to mount 602. The magnetic mount is designed to work with a candle 600 having a metal sleeve. Magnetic mount 602 thus helps prevent candle 600 from tipping over when device 500 is being transported and when device 500 is hung from a support and swings in the wind. Candle 600 is protected from the wind by the walls of combustion chamber 514. Candle 600 also produces light that attracts insects.

Candle 500 may be placed into and removed from combustion chamber 514 by lifting the body that defines chambers 514 and 516 from mount 602. The body defines openings 603 that allow air to flow into chamber 514 and, in some situations, carbon dioxide to fall out of chamber 514 into grid 521. Openings 603 are small in diameter to prevent wind from blowing out candle 600. A plurality of pinhole openings may be used to protect candle 500.

The body that defines combustion chamber 514 defines a broad base 700 and a narrow neck 702. The body tapers smoothly from base 700 toward neck 702. Neck 702 defines at least one outlet 704 that allows the heated gasses to escape chamber 514 into chamber 516.

Cooling chamber 516 is disposed around at least the upper portion of combustion chamber 514. The body that defines cooling chamber 516 defines at least one outlet 706 that allows gas to exit chamber 516 into chamber 518. Outlet 706 is disposed lower than outlet 704 so that the cooling gases will readily exit chamber 516. The gas cools and drops through chamber 518 creating a flow that draws more flow into chamber 518. Mixing chamber 518 has an upper outlet 708 and a lower outlet 710 so that gas may be directed adjacent both grids 520,521. An outer wall 712 defines chamber 518. Wall 712 may be supported by grid 521 and/or cage 524. Wall 712 also protects candle 600 from wind.

A bait receptacle 800 sits directly on top of cooling chamber 516 so that the heated gas entering cooling chamber 516 will heat the lower wall of receptacle 800 to warm the bait disposed in receptacle 800. The warmed bait will evaporate into grid 520. Again, any of a variety of baits may be used such as those discussed above.

In an alternative embodiment, a substance to extinguish candle 600 (such as water or a powder) may be disposed between portions of combustion chamber 514 and cooling chamber 516 or between cooling chamber 516 and bait receptacle 800. This substance would be released to extinguish candle 600 if device 500 were subjected to sufficient force to break part of the body that defines chambers 514 and 516. This substance thus acts as a safety device for device 500.

Figure 6:
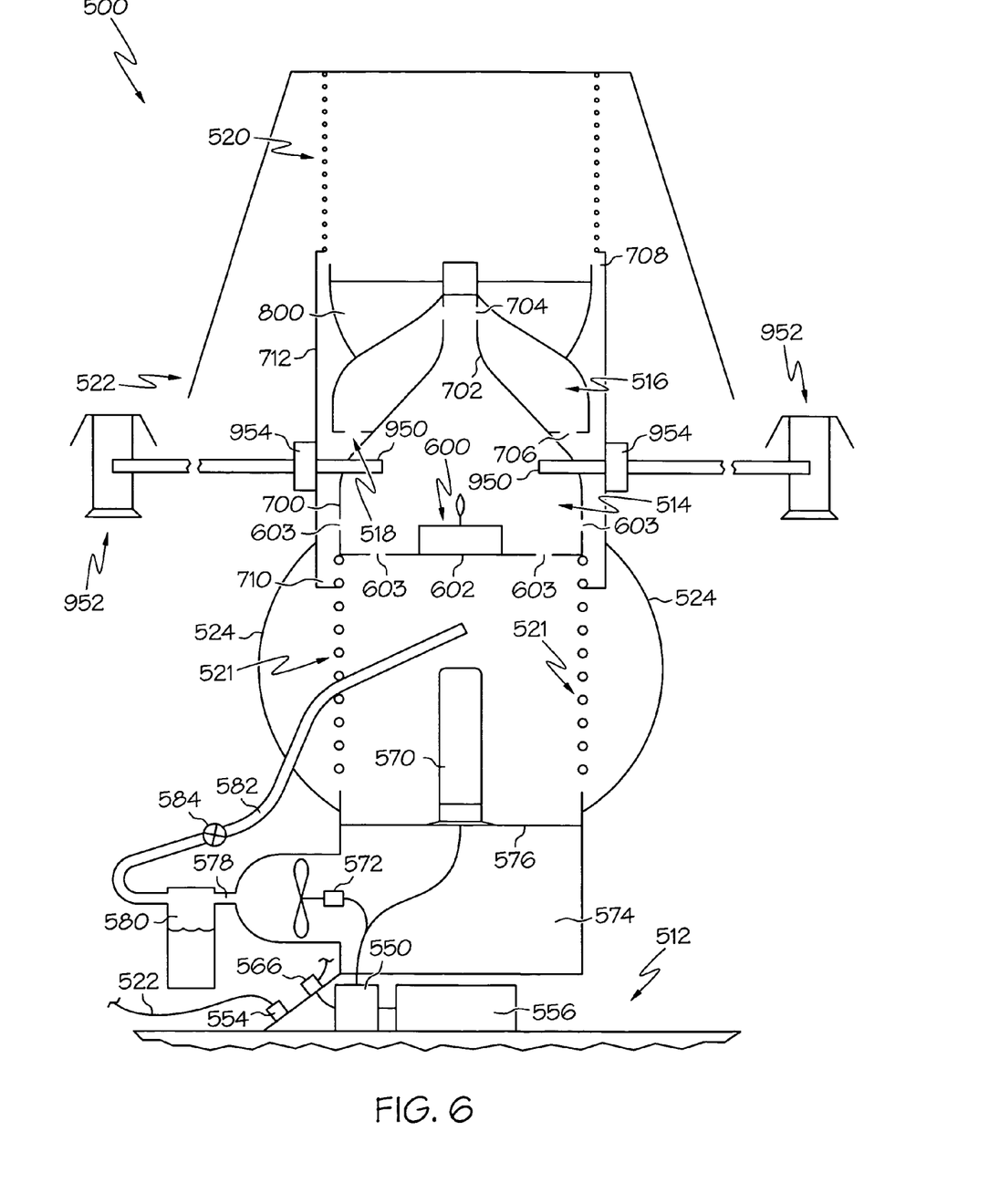
FIG. 6 is a view similar to FIG. 3 showing an alternative embodiment of the invention.

An alternative embodiment of the invention is shown in FIG. 6 wherein take off pipes 950 are provided in combustion chamber 514. Take off pipes 950 may also be provided inside grid 521. Pipes 950 are used to supply secondary killing devices 952 disposed at remote locations. Fans or air pumps 954 are provided to move the gas from combustion chamber 514 to devices 952. Devices 952 may be powered or unpowered. In one example, device 951 may use a small electric heater under its bait receptacle.

Figure 7:
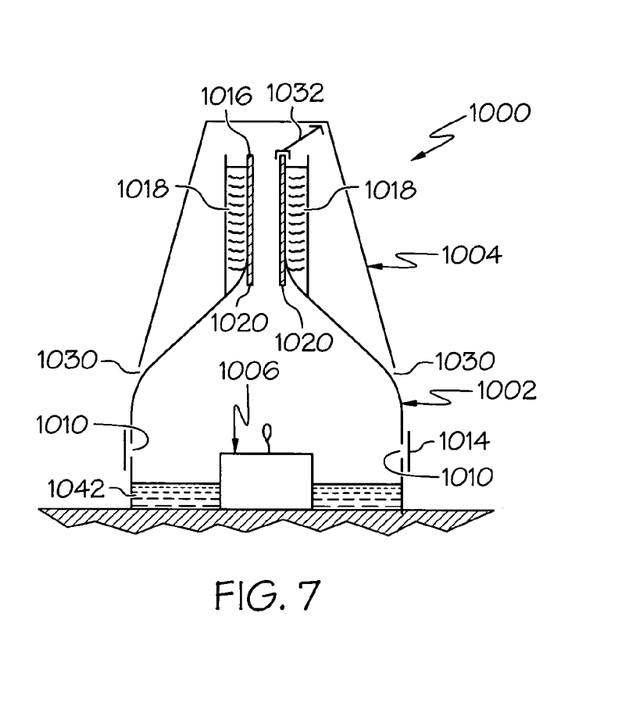
FIG. 7 is a cross section of a lamp incorporating the combustion and cooling chambers of the bug killing device.
Figure 8:
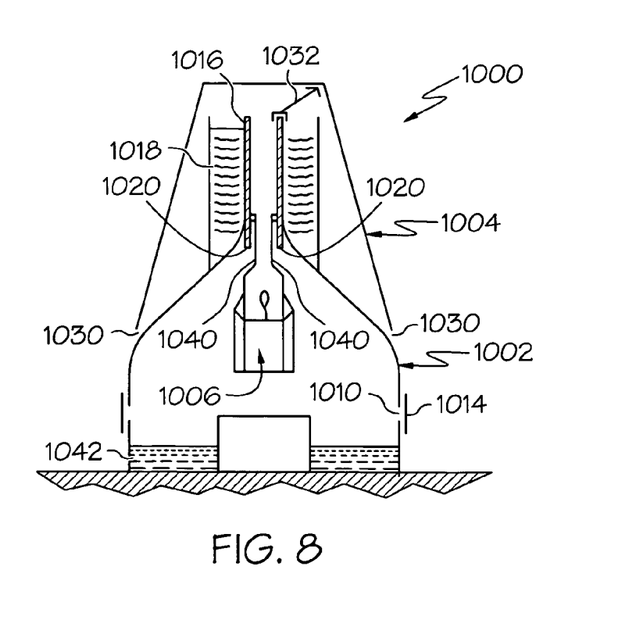
FIG. 8 is a cross section of an alternate configuration for the lamp of FIG. 7.
Figure 9:
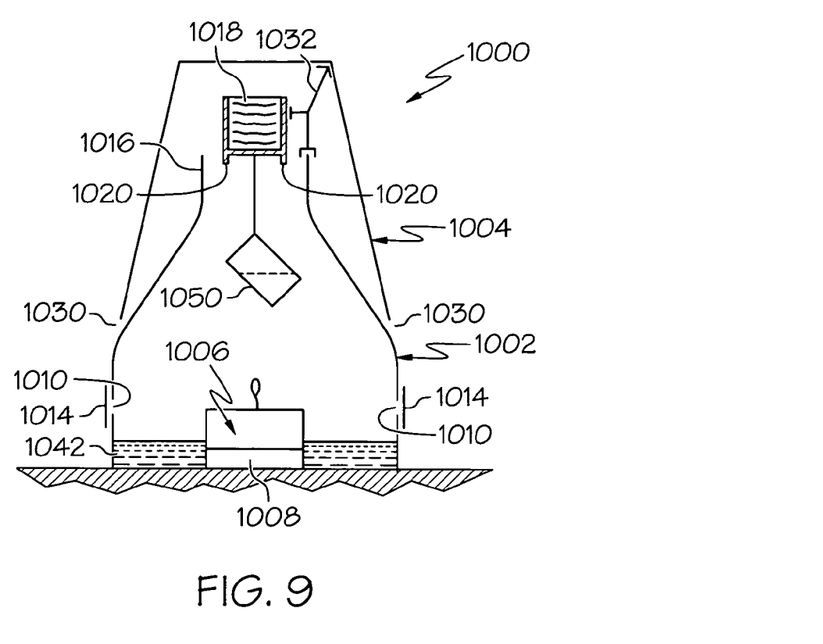
FIG. 9 shows another configuration of the lamp.

Alternative lamp configurations for the combustion and cooling chambers discussed above are depicted in FIGS. 7-10. Lamp 1000 of FIG. 7 generally includes a combustion chamber 1002 and a cooling chamber 1004 similar to those described above. A wax or oil candle 1006 (with optional scent materials) is disposed in combustion chamber 1002. The top of chamber 1002 may be removable from the bottom half in order to insert candle 1006. Alternatively, a door may be provided in the side of chamber 1002 to provide access. Candle 1006 may sit directly on the bottom wall of the chamber as shown in FIG. 7 or on a mount 1008 as shown in FIG. 9. Mount 1008 may be magnetic and/or adjustable to provide for different heights. Candle 1006 also may be suspended within chamber 1002 as shown in FIG. 8. At the least the sidewall of chamber 1002 is transparent to allow the light generated by candle 1006 to illuminate the area surrounding lamp 1000.

At least one combustion air inlet 1010 is defined by the sidewall of chamber 1002. An adjustable cover 1014 deflects wind and allows the user to adjust the amount of air being drawn into chamber 1002. The heat generated from candle 1006 creates an upward flow of air and combustion product through the neck 1016 of chamber 1002 where the flow exits chamber 1002 into cooling chamber 1004. A reservoir 1018 surrounds at least a portion of neck 1016 where it is heated by the hot upward flow from candle 1006. In one embodiment of the invention, a scented material is disposed in reservoir 1018. The heat evaporates the scented material allowing it to mix with the flow through cooling chamber 1004. In another embodiment, reservoir 1018 is filled with the fuel (optionally scented) used by candle 1006. In order to increase the safety of lamp 1000, the fuel may be held in a porous medium to prevent spills. The porous medium may be a silica material that substantially fills reservoir.

When a fuel is used in reservoir, neck 1016 is fabricated from a material that retains heat (such as copper) and includes a drip edge 1020 disposed above candle 1006. Neck 1016 will heat up and wick fuel over its top edge and allow the fuel to run down along its inner surface where the fuel drips into candle 1006 from drip edge 1020. Candle 1006 may thus be recharged from reservoir as it burns. When the fuel is scented, the wicking action of neck 1016 exposes a large area of fuel to be evaporated as the fuel falls down along the inner surface of neck 1016. In FIG. 9, reservoir is disposed in the middle of neck 1016. If wicking is desired in this embodiment, the outer walls of reservoir 1018 are fabricated from a material that retains heat with drip edge 1020 disposed under reservoir 1018.

The outlet 1030 to cooling chamber 1004 is disposed below the outlet of neck 1016 such that the flow from neck 1016 is turned downwardly as it cools before it exits chamber 1004. In one configuration, the upper and side walls of chamber 1004 are solid to completely protect neck 1016 from wind or rain. This structure allows lamp 1000 to be used outdoors. The structure also prevents children from dropping items into combustion chamber 1002. In an alternative configuration, the upper portion of chamber 1004 defines a series of small holes to allow some of the evaporated scent to exit chamber 1004 through the upper wall. The walls of chamber 1004 may be fabricated from a transparent material to allow the light of candle 1006 to shine through the walls. In situations where the user simply wants to distribute a scent, the walls may be colored or opaque. Cooling chamber 1004 may be supported above combustion chamber 1002 with a plurality of supports 1032.

The walls of chamber 1004 are far enough from candle 1006 to remain cool even after extended use of lamp 1000. The upper portion of lamp 1000 thus will not catch articles on fire that may come in close proximity to lamp 1000. When chambers 1002 and 1004 are made from glass and candle 1006 is a typical votive-style or tea light-style candle, lamp 1000 remains cool enough to place newsprint over the top of lamp 1000 without combustion.

When suspended from above as shown in FIG. 8, candle 1006 is supported by a pair of arms 1040 that are biased outwardly to frictionally engage the inner wall of the neck 1016 of chamber 1002. The position of candle 1006 within chamber 1002 may be adjusted by moving arms 1040 up and down with respect to neck 1016. Raising and lowering candle 1006 will adjust the height of the flame. The connection between arms 1040 and neck 1016 is at least frictional. Neck 1016 may be provided with projections or grooves that provide purchase to the ends of arms 1040 while also increasing he capillary action for the fuel in reservoir 1018.

Combustion chamber 1002 is designed to hold liquid 1042 in the bottom of the chamber. Liquid 1020 may be colored in order to decorate lamp 1000. Liquid 1042 is also non-combustible, such as water, so that candle 1006 will be extinguished if candle 1006 tips over into liquid 1042. If desired, this liquid could be scented. FIG. 9 shows an optional safety feature wherein a non-combustible power is disposed in a cup 1050 above candle 1006. Sharp movements of lamp 1000 will shower the powder onto candle 1006 to extinguish candle 1006. If desired, powder may be scented with cup 1050 acting as a heat sink to warm and evaporate the scent.

Lamp 1000 selectively delivers air to candle 1006 and may thus be used to increase the burn length of a typical candle. The burn time of a candle having an open-air burn time of four hours may be increase by 50 percent in lamp 1000 while still providing illumination and scent distribution.

Figure 10:
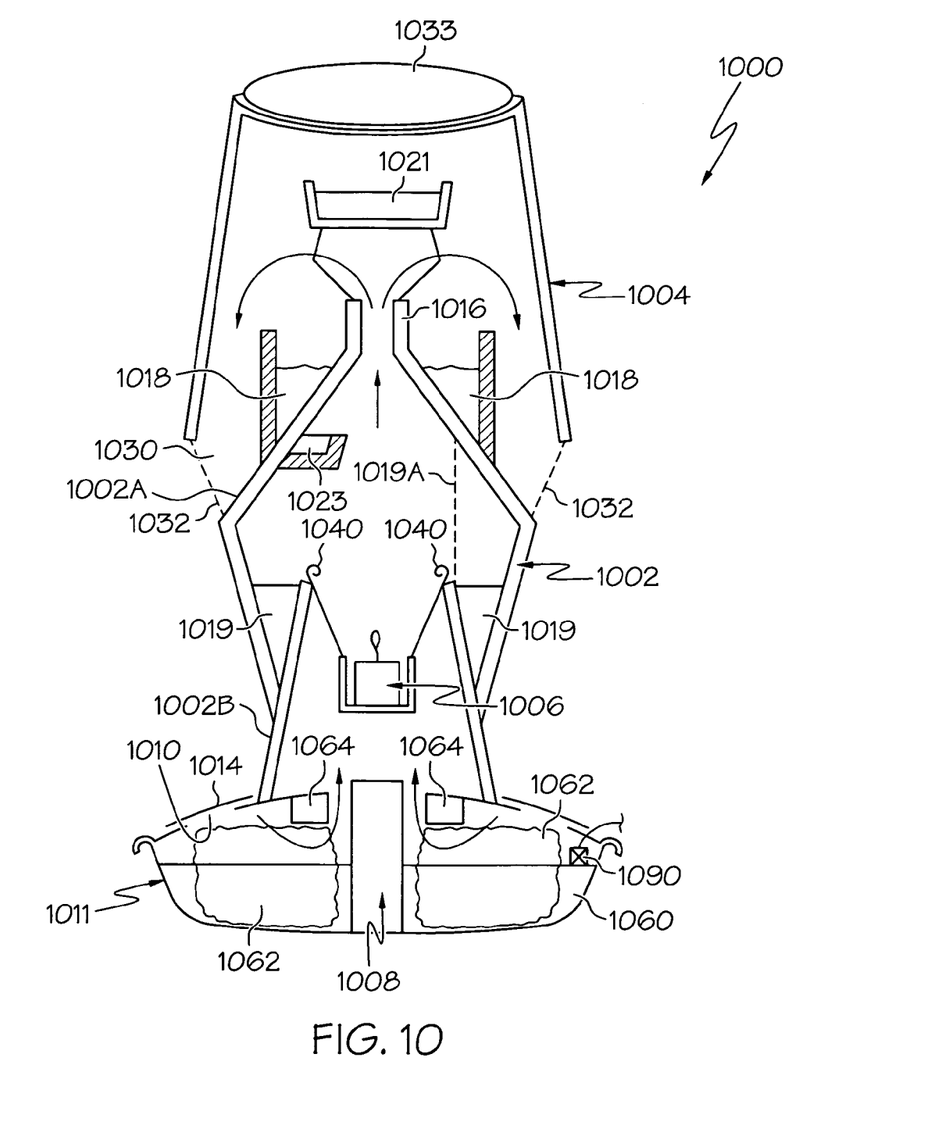
FIG. 10 shows another configuration of the lamp.

Lamp 1000 of FIG. 10 provides a different configuration which generally includes a combustion chamber 1002 and a cooling chamber 1004 similar to those described above. A wax or oil candle 1006 (with optional scent materials) is disposed in two-part combustion chamber 1002. The top 1002A of chamber 1002 may be removable from the bottom 1002B in order to insert candle 1006. Alternatively, a door may be provided in the side of chamber 1002 to provide access. Candle 1006 may sit directly on the bottom wall of the chamber or on mount 1008 as described above. Candle 1006 also may be suspended within chamber 1002 as shown in FIG. 10.

At least one combustion air inlet 1010 is defined by an inlet chamber 1011 disposed below chamber 1002. Chamber 1011 may be used to remove some particulate matter from the air when lamp 1000 is in use. An adjustable cover 1014 deflects wind and allows the user to adjust the amount of air being drawn into chamber 1002 to control the height of the candle flame. The heat generated from candle 1006 creates an upward flow of air and combustion product through the neck 1016 of chamber 1002 where the flow exits chamber 1002 into cooling chamber 1004. Optionally, neck 1016 may define air inlets that draw air from chamber 1004 back into neck 1016 (additional scent reservoirs may be supplied in this air flow path).

As described above, a reservoir 1018 for holding a scented material may surround at least a portion of neck 1016 (and optionally a portion of chamber 1002) where it is heated by the hot upward flow from candle 1006. The heat evaporates the scented material allowing it to mix with the flow through cooling chamber 1004.

In the configuration of the invention depicted in FIG. 10, the sidewall of the combustion chamber 1002 defines a second reservoir 1019 is disposed either outwardly of the location of the candle or directly above the location of the candle. The user may place additional scented material in reservoir 1019 where the scent will be warmed, evaporated, and dispersed. FIG. 10 shows reservoir 1019 disposed between the upper portion of bottom 1002B and the lower portion of top 1002A radially outwardly of the candle. This location places reservoir 1019 in a location that causes viewers to look through the liquid in reservoir 1019 to see the candle flame (from most angles).

Another feature of this configuration is that second reservoir 1019 has a volume small enough to prevent any liquid held in reservoir 1019 from exiting through neck 1016 when lamp 1000 is tipped from the vertical position depicted in FIG. 10 to a horizontal position. Bottom 1002B may be configured to prevent any liquid from reservoir 1019 from flowing into the upper opening of bottom 1002B so that all of the liquid will return to reservoir 1019 when the horizontal lamp is returned to the vertical configuration. When lamp 1000 is in the horizontal position, the liquid in reservoir 1019 will be disposed under reference line 1019A. The area defined by the sidewall of combustion chamber 1002 is thus defined as a holding area. The holding area has a volume larger than the volume of reservoir 1019. This configuration also allows reservoir 1019 to be filled by pouring a liquid into chamber 1002 through neck 1016.

A third reservoir 1021 may be disposed directly above neck 1016. The bottom of third reservoir 1021 may also function as a heat shield to prevent the top of cooling chamber 1004 from being directly heated by candle 1006. An optional fourth reservoir 1023 may be disposed inside chamber 1002. An optional insulator 1033 may be used on top of chamber 1004.

In one embodiment, chamber 1002 is used alone with only second reservoir 1019 to form the lamp. This configuration of the invention provides protection from the flame while also efficiently distributing any scent disposed in the second reservoir.

Inlet chamber 1011 may include a liquid-impervious lower wall that defines a basin for holding water 1060. Inlet 1011 is disposed above the upper surface of water 1060 to cause the incoming air flow to pass across the upper surface of the water wherein particulate matter may drop out of the air into the water. Filters 1062 also may be used to clean the incoming air flow. An optional ring-shaped magnet 1064 may be disposed around mount 1008 to subject the incoming air flow to a magnetic field.

These lamps may be used as centerpieces or decorations. In some configurations, a pump 1090 (FIG. 10) may be used to draw the non-combustible fluid from the bottom of the lamp to discharge the liquid through a tube on top of the lamp. The supply tube may be disposed on the outside of the lamp or on the inside of the lamp. In either application, the supply tube may be configured to continuously refill reservoirs 1018 and/or 1019 until they overflow and drain down into the bottom of the lamp. The liquid will flow down over the outer surface (or the inner surface when the reservoir) of the cooling chamber and then drip onto the outer surface of the combustion chamber (when the combustion chamber is wider than the cooling chamber) and back into the basin at the bottom of the lamp. When the lamp is used as a fountain in this manner, the person viewing the lamp will look through the moving liquid on the outside of the combustion chamber to see the flame. Another advantage is that the liquid cools the exterior of the lamp. A further advantage is that an unscented candle may be used to provide the heat and airflow in combination with a scented fluid in the basin. Spreading the scented fluid over the lamp provides an efficient manner of distributing the scent without using a scented candle.

Figure 11:
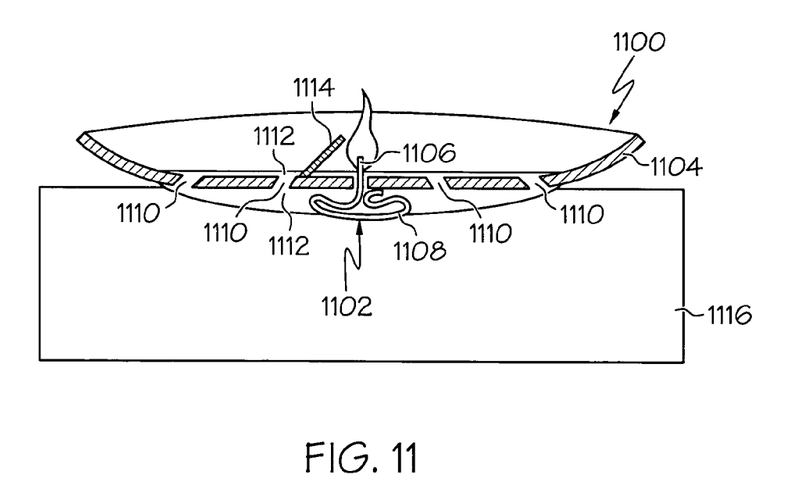
FIG. 11 depicts an exemplary configuration of a floating wick.

A floating wick is indicated generally by the numeral 1100 in FIG. 11. Wick 1100 may be used with or without the devices described above. Wick 1100 may be used with a variety of candles or wax bodies to create candles. Wick 1100 is more efficient at using the wax of the candle than a traditional wick that is disposed through the wax body. Wick 1100 is more efficient at using the fuel by melting wax across a broader surface than a traditional wick.

Floating wick 1100 includes a wick 1102 and a melt plate 1104. Wick 1102 is fabricated from a traditional wick material such as cotton, paper fibers, wool, metal filaments, and the like. Wick 1102 has an upper portion 1106 disposed above plate 1104 and a lower portion disposed below plate 1104. Lower portion 1104 may be pulled up through plate 1104 as upper portion 1106 is consumed to replace upper portion 1106. Lower portion 1108 also functions to gather melted wax and direct it toward upper portion 1106 when wick 110 is being used.

At least a portion of plate 1104 defines a bowl-shaped upper surface with at least one opening 1110 that is used to allow melted wax 1112 to flow onto the bowl-shaped upper surface of plate 1104 where the melted wax comes into contact with upper portion 1106 of wick 1102.

Plate 1104 is fabricated from a material that readily absorbs and transmits heat energy so that plate 1104 will quickly warm once upper portion 1106 is lit. Copper and aluminum have been found to be effective for transmitting the heat from the flame to the wax. Plate 1104 may have a heat gathering structure adjacent the location of the flame. This structure may be a raised body adapted to be warmed by the flame and to transmit the heat to the body of the plate. One exemplary embodiment of such a structure is one or more cantilevered fingers 1114 that extend adjacent the flame. Fingers 1114 may be cantilevered sections of plate 1104 or may be separate elements connected to plate 1104. Another example is a raised ring of material disposed around upper wick portion 1106.

Floating wick 1100 is used by placing it on a block of fuel such as a wax block 1116. Wax block 1116 may be an old candle that as been squared off or filled with wax to provide a generally flat upper surface that receives wick 1100. The user then lights the upper portion 1006 of wick 1002 and plate 1004 begins to warm and melt the wax closest to the flame. This melted wax is burned and evaporated as plate 1004 melts a wider and wider area of wax under plate 1004. The melted wax flows through openings 1110 to form a pool around upper wick portion 1106. Plate 1004 is thus used to melt a larger diameter of wax than would be ordinarily melted by a fame burning on a traditional wick. Floating wick 1100 thus allows the user to efficiently consume wax 1116. Plate 1104 thus may be provided in a series of diameters that match the diameters of traditional column-shaped candles. Another advantage is that lower portion 1008 may simply rest on top of wax 1116 because plate 1004 holds upper portion 1006 in an upright configuration for burning. There is no need to run the wick into the body of the wax before lighting wick 1100.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. In addition, the elements described for one embodiment may be interchanged with the elements for the other embodiments without departing from the concepts of the invention. The chambers may have any of a variety of cross sectional shapes including, for example, round, oval, square, rectangular, and triangular.

The invention claimed is:

1. A lamp comprising:
   a combustion chamber having a top and a bottom; the combustion chamber having an air outlet;
   a cooling chamber disposed above the combustion chamber; the cooling chamber having an air inlet;
   the air outlet of the combustion chamber being in fluid communication with an air inlet of the cooling chamber;
   the cooling chamber having an air outlet; the air outlet of the cooling chamber being disposed below the air inlet to the cooling chamber such air flow through the cooling chamber is turned downward from the air outlet of the combustion chamber;
   a light source disposed in the combustion chamber;
   the combustion chamber having a sidewall having an outer surface;
   a liquid basin under the light source; a non-combustible liquid disposed in the liquid basin; and
   a pump in fluid communication with the liquid basin; the pump adapted to distribute the liquid from the liquid basin over the top of the cooling chamber.

2. The lamp of claim 1, wherein the cooling chamber is adapted to deliver the liquid from the pump back to the liquid basin.

3. The lamp of claim 2, further comprising a filter disposed in the liquid basin.

4. The lamp of claim 1, wherein the cooling chamber defines a lower rim disposed below the top of the combustion chamber and above the bottom of the combustion chamber.

5. The lamp of claim 4, wherein the lower rim of the cooling chamber is disposed directly above the liquid basin such that liquid will fall off of the cooling chamber into the liquid basin.

6. The lamp of claim 1, wherein the liquid basin defines an air inlet and an air outlet; the air outlet of the liquid basin being in fluid communication with the combustion chamber.

7. The lamp of claim 1, wherein the light source is a candle suspended in the combustion chamber.

8. A lamp comprising:
   a combustion chamber having a top and a bottom; the combustion chamber having an air inlet and an air outlet;
   a cooling chamber disposed above the combustion chamber; the cooling chamber having an air inlet;

the air outlet of the combustion chamber being in direct fluid communication with an air inlet of the cooling chamber;

the cooling chamber having an air outlet; the air outlet of the cooling chamber being disposed below the air inlet to the cooling chamber such air flow through the cooling chamber is turned downward from the air outlet of the combustion chamber;

a candle disposed in the combustion chamber;

the combustion chamber having a sidewall having an outer surface;

a liquid basin disposed under the combustion chamber; a non-combustible liquid disposed in the liquid basin; and a pump in fluid communication with the liquid basin; the pump adapted to distribute the liquid from the liquid basin over a portion of the lamp.

9. The lamp of claim 8, wherein the pump delivers the liquid over the top of the cooling chamber; the cooling chamber being adapted to deliver the liquid from the pump back to the liquid basin.

10. The lamp of claim 9, further comprising a filter disposed in the liquid basin.

11. The lamp of claim 8, wherein the cooling chamber defines a lower rim disposed below the top of the combustion chamber and above the bottom of the combustion chamber; the lower rim of the cooling chamber being disposed directly above the liquid basin such that liquid will fall off of the cooling chamber into the liquid basin.

12. The lamp of claim 8, wherein the liquid basin defines an air inlet and an air outlet; the air outlet of the liquid basin being in direct fluid communication with the air inlet of the combustion chamber.

13. The lamp of claim 8, wherein the candle is suspended in the combustion chamber.

14. The lamp of claim 8, wherein the combustion chamber defines a first reservoir adapted to hold a scented liquid that may be heated by the candle.

15. The lamp of claim 14, wherein the cooling chamber defines a second reservoir adapted to hold a scented liquid that may be heated by the candle.

16. The lamp of claim 15, wherein the combustion chamber includes a neck that projects into the cooling chamber; the second reservoir surrounding the neck.

17. The lamp of claim 8, further comprising a magnet disposed adjacent to the air inlet to the combustion chamber.

18. A lamp comprising:
a combustion chamber having a top and a bottom; the combustion chamber having an air inlet and an air outlet;

a cooling chamber disposed above the combustion chamber; the cooling chamber having an air inlet;

the air outlet of the combustion chamber being in direct fluid communication with an air inlet of the cooling chamber;

the cooling chamber having an air outlet;

a candle disposed in the combustion chamber;

the combustion chamber having a sidewall having an outer surface;

a liquid basin disposed under the combustion chamber; a non-combustible liquid disposed in the liquid basin;

a pump in fluid communication with the liquid basin; the pump adapted to distribute the liquid from the liquid basin over the top of the cooling chamber; and the cooling chamber defining a lower rim disposed directly above the liquid basin such that liquid will fall off of the cooling chamber into the liquid basin.

19. The lamp of claim 18, wherein the combustion chamber defines a first reservoir adapted to hold a scented liquid that may be heated by the candle.

20. The lamp of claim 19, wherein the cooling chamber defines a second reservoir adapted to hold a scented liquid that may be heated by the candle.

* * * * *